May 19, 1970  W. H. JOHNSON  3,512,728
UNCOILER
Filed Dec. 4, 1967  3 Sheets-Sheet 3
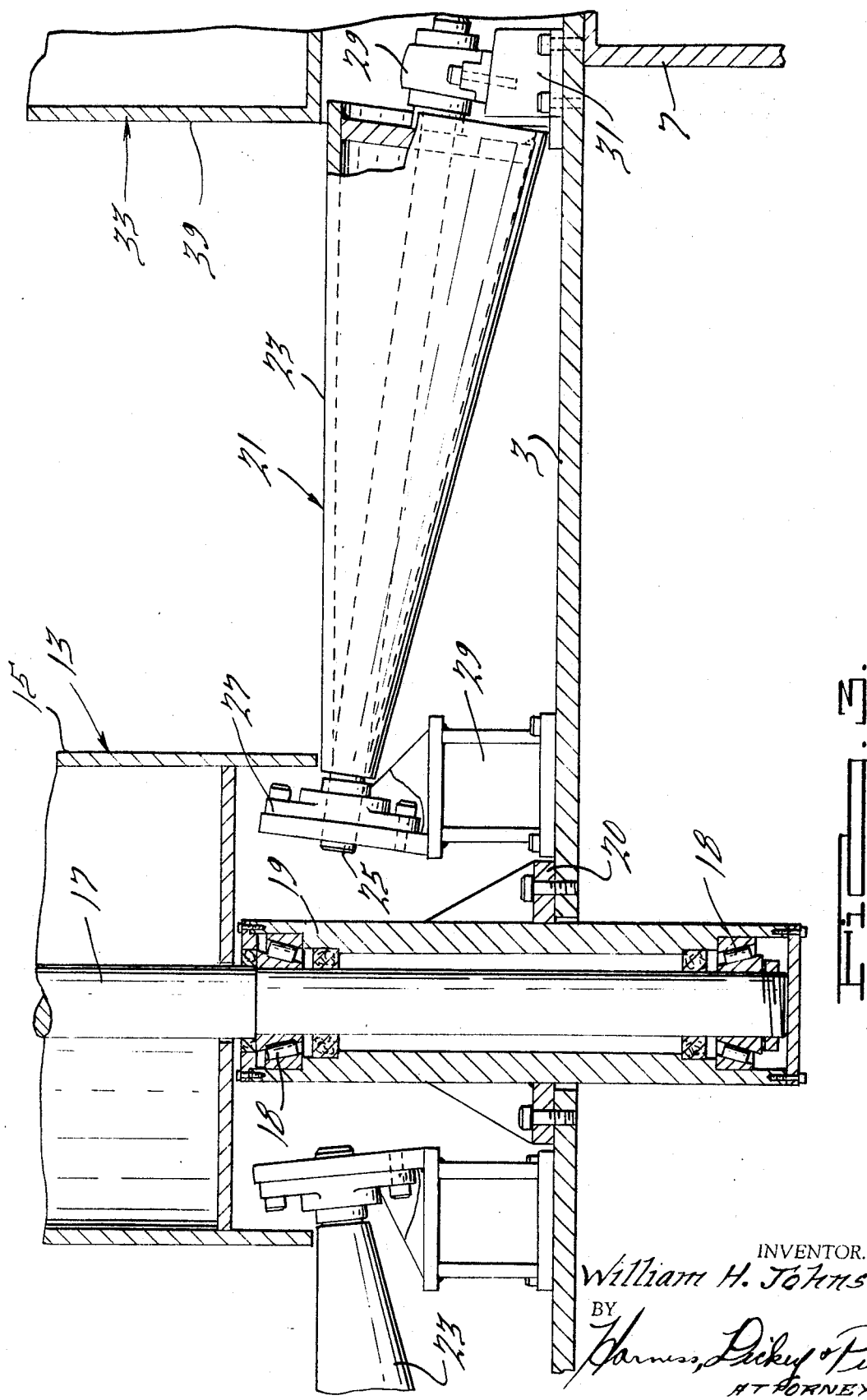
INVENTOR.
William H. Johnson
BY
Harness, Dickey & Pierce
ATTORNEYS.

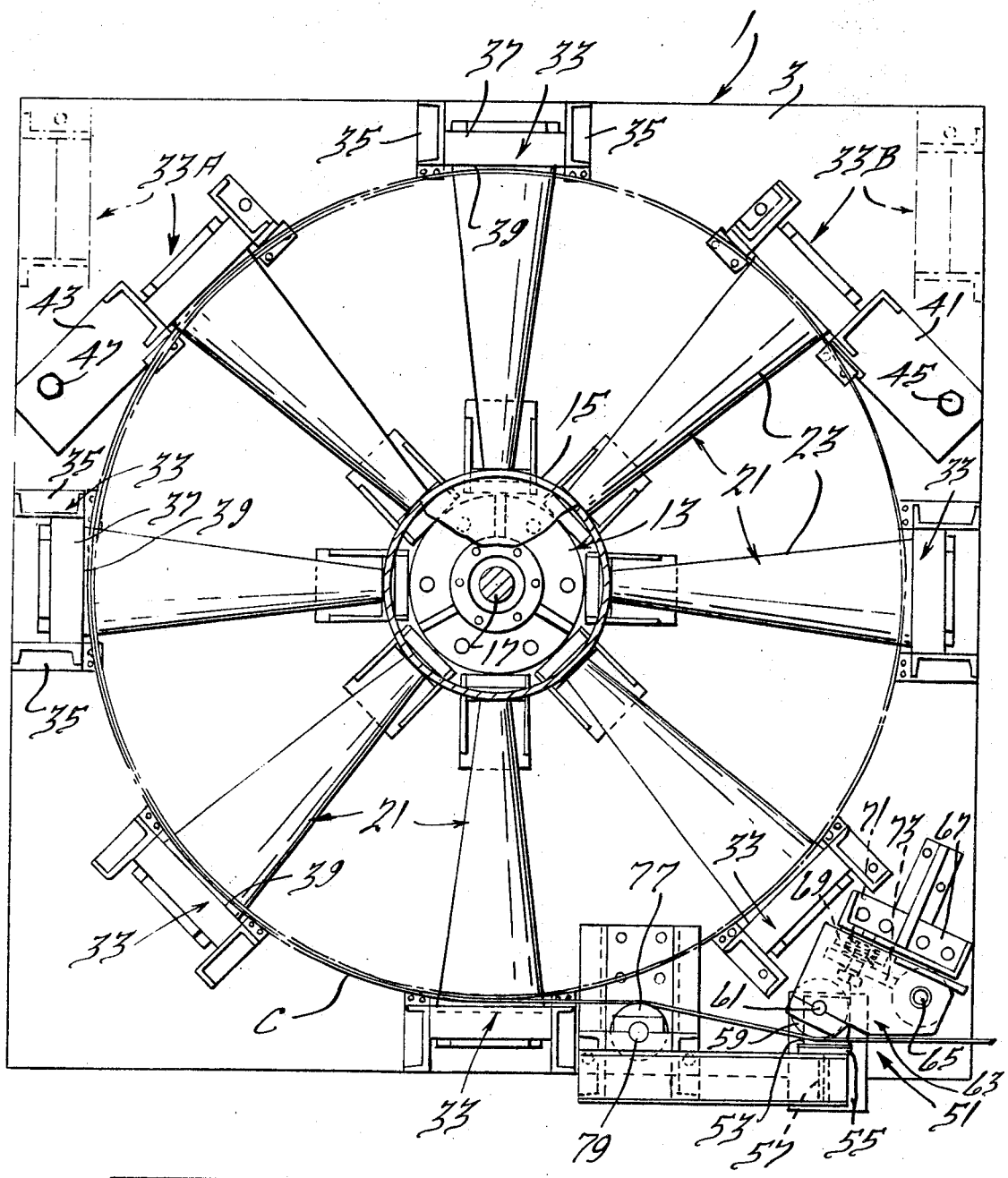

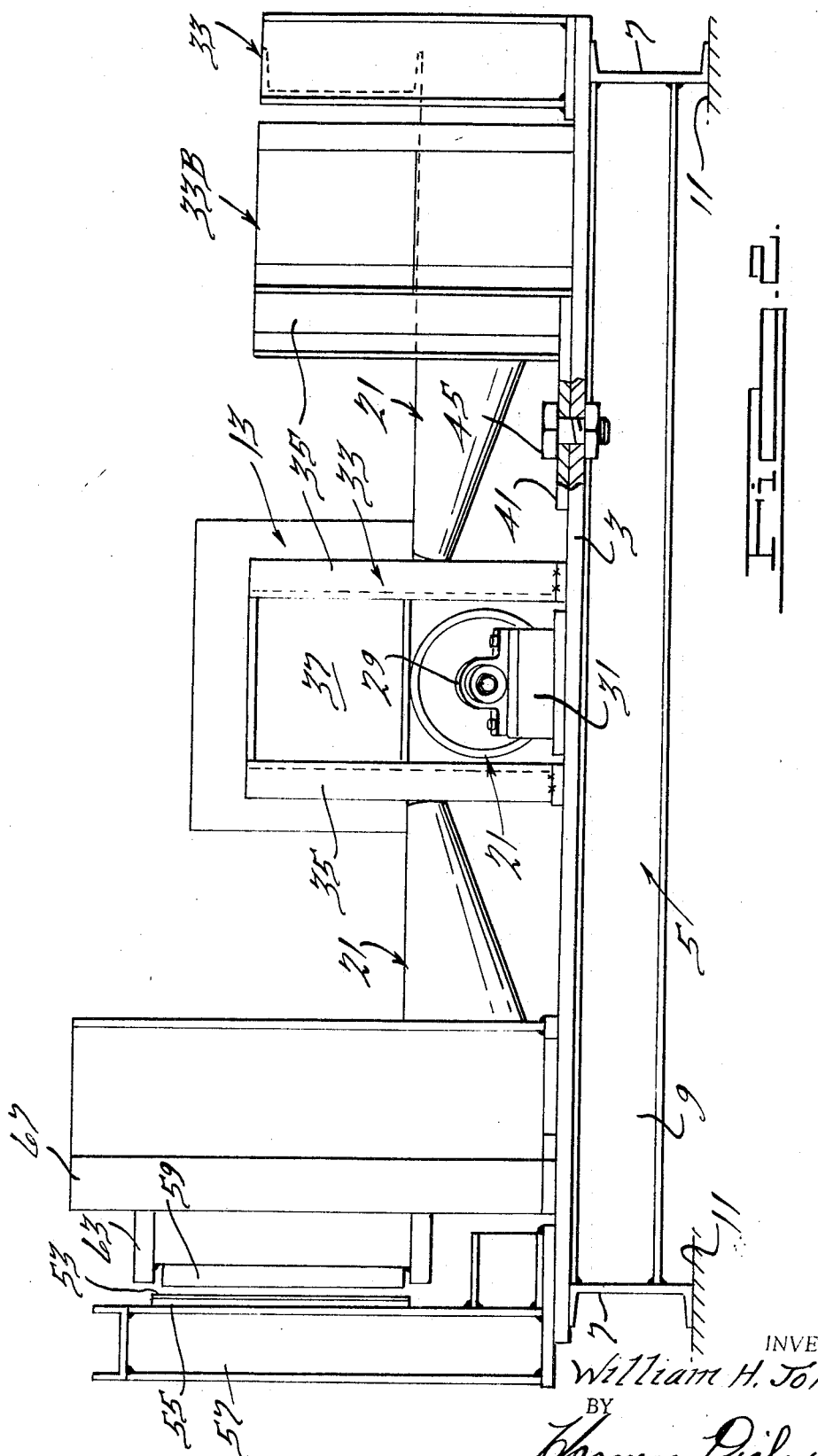

United States Patent Office 3,512,728
Patented May 19, 1970

3,512,728
UNCOILER
William H. Johnson, Harrisonburg, Va., assignor, by mesne assignments, to Tenneco Inc., Houston, Tex., a corporation of Delaware
Filed Dec. 4, 1967, Ser. No. 687,827
Int. Cl. B21c *47/16*
U.S. Cl. 242—78.6                                13 Claims

ABSTRACT OF THE DISCLOSURE

An uncoiling apparatus for large coils of steel has a rotatable center core to receive the center aperture in the coil of steel. Radiating from the center core are a series of tapered rollers on which the coil of steel is supported. At the outer radial ends of the tapered rollers are a series of vertically extending fences. The uncoiler has a pay-out section which includes an automatically operated brake mechanism that places braking pressure on the strip of steel leaving the uncoiler when the pull or tension on the strip is reduced. When this happens, centrifugal force on the coil causes it to expand radially so that the outermost coil engages the surfaces of the fences and the resulting friction acts as a brake to reduce the rotation of the coil.

BACKGROUND OF THE INVENTION

In the automatic high speed production of metal parts made from strip steel, such as welded tubing, the strip steel is furnished in the form of large coils sometimes as large as 5 or 6 feet in diameter. The steel is unwound from these coils and fed through elaborate machinery to a tube mill (in the case of tubing) which rolls the flat steel strip into tubular shape and welds the abutting edges together. Various things can happen at the tube mill or manufacturing end of the procedure causing slowdown or even shutdown of the operation, and this of course is reflected back into what must be done with the coil of steel which has been rotating to furnish the raw material from which the tube is being made.

In the past, special equipment has been required to provide proper control of the rotating coil of steel to conform it to conditions downstream. Complications can ensue even though there may be a looper in the circuit. For example, in the case of slowdown, improper control of the uncoiler can result in overspinning and the strip may fan out upon the floor of the factory, since it is being paid out by the uncoiler at a greater rate than it is being used by the manufacturing equipment. This obviously is very hazardous to personnel and equipment in the neighborhood of the uncoiling apparatus. It is difficult to prevent with currently used apparatus, since, in the case of tubing, a typical installation would require a strip deceleration of 150 feet per minute in 1.5 seconds to avoid overrun and dumping of the strip on the floor.

BRIEF SUMMARY OF THE INVENTION

It is the purpose of the invention to provide a relatively simple method and apparatus for the uncoiling of large coils of steel which is safe and reliable in operation and which eliminates the need for elaborate controls and the danger of overload on the drive motors used in the production line.

The invention accomplishes this purpose by mounting the coil of steel on a series of radially extending tapered rollers and by surrounding the outer periphery of the rotatably mounted coil with a series of fences against which the coil can expand in the event that it is rotating at a greater speed than the rate at which the strip is being consumed by the production apparatus downstream from the coil. When the coil expands by centrifugal force into contact with the retaining fence, a frictional drag is exerted on the strip stock and this is transferred back into the coil which, in essence, makes each wrap of the coil act as a brake for the next wrap. In this way the coil automatically brakes itself by means of its radial contact with the fences.

In addition, the uncoiler may employ at its outlet end an automatically operated brake mechanism which applies brake shoe pressure against the strip when tension on the strip is reduced due to consumption of the steel at a lower linear speed than it is paid out by intertia due to rotation of the coil. The brake mechanism is such that normal consumption of steel providing for normal tension on the strip results in withdrawal of the brake mechanism so that the strip is paid out without tension or resistance from the brake mechanism. In fact, there is a substantially tension-free pay-off because of this and because of the differing diameters of the tapered rollers which compensate for speed variation at the varying diameters of the coil.

DESCRIPTION OF THE DRAWINGS

FIG. 1 is a plan view (partly broken away) of an uncoiling apparatus embodying the principles of the invention:

FIG. 2 is a side elevation taken from the right side of FIG. 1; and

FIG. 3 is an enlarged section, partly broken away, along a radial plane in FIG. 1.

DESCRIPTION OF THE INVENTION

The uncoiling apparatus 1 for coil C has a base plate 3 which may itself be self-supported upon a suitable framework 5, composed of channel-shaped members 7 and 9, which, in turn, is supported upon the factory floor 11. Located centrally of the plate 3 is a freely rotatable spindle structure 13 comprising an outer drum or coil centering roll 15 which is suitably secured to and mounted upon a vertical shaft 17. The lower end of the shaft 17 is rotatably mounted on a tapered bearing structure 18 that is carried by a spindle support housing 19 which is applied by means of flanges 20 to the plate 3.

Extending radially from the centering drum 15 are eight roller-type coil support structures 21. As seen best in FIG. 3, each of the structures includes a tapered roller 23 which is arranged so that the top of its conical surface extends horizontally or parallel to the floor and perpendicular to the vertical axis of the shaft 17. This is accomplished by arranging the rotatable shaft 25 on which the roller 23 is mounted so that it extends at an angle as seen in FIG. 3. The opposite ends of each of the shafts 25 are mounted in substantially friction-free bearing structures 27 and 29 which may in turn be mounted on suitable pedestal supports 29 and 31 on the plate 3. The various diameters of the rollers 23 which engage the coil are proportional to the diameters of the coil wraps so the taper of the rollers 23 will compensate for the linear speed variation along a radius of the coil and will tend to even out the relative surface speeds so that relatively little friction occurs between the edges of the coil and the rollers. The coils are thus centered by drum 15 and supported for free, substantially unresisted rotation by the rollers 23.

Located at the outer radial end of each of the tapered rollers structures 21 is a fence structure 33 which comprises support channels 35 on either side and a fence plate 37 rigidly secured between and to them and presenting a face 39 directed toward the centering spindle 15. The fence structures 33A and 33B may be made movable (i.e., made gates) by securing them to plates 41 and 43 which are pivoted by means of pins 45 and 47 to the support plate 3 so that the fence structures 33A and 33B can be swung outwardly to the dotted line position indicated in FIG. 1.

When the gates 33A and 33B are swung to the outermost position, a side of the uncoiler is opened so that a fork truck carrying a coil of steel can drive over the uncoiler and center a coil on the drum 15 and load the uncoiler.

The uncoiler 1 has a pay-out or outlet section 51 which appears adjacent the lower right-hand corner in FIG. 1. The actual outlet or exit point for the strip of steel occurs between a flat vertically extending brake shoe surface 53, which is secured to the face of a back-up plate 55 that is attached to the beam structure 57 mounted on the plate 3, and a floating lead-out roller 59 which is mounted upon a freely rotatable vertical shaft 61 which is secured on a pivot arm 63. The pivot arm 63 is mounted upon a freely rotatable pivot shaft 65 which is supported on a back-up structure 67. Structure 67 is secured to the top of the plate 3 and it includes a spring retainer 69 for the coil spring 71 which is pressing against a ledge 73 on the arm 63. A bolt 75 is provided to adjust the compression of spring 71.

A freely rotatable, fixed position lead-out roll 77 is mounted on rotatable shaft 79 that is carried by beam structure 57. Its surface is aligned with that of the adjacent fence face and the roll facilitates pay-out of the strip when it is in the expanded condition. During the normal run condition the coil wraps will be tight due to tension on the strip and out of contact with roll 77.

While the uncoiler of this invention is capable of other uses one important application is in the manufacture of tubing from strip steel supplied as raw stock in the form of coils. In this application the steel strip which is paid out by the uncoiler 1 goes first to a looper (not shown), which is commercially available equipment, and from the looper to the tube mill (not shown) where it is formed into tubing. The looper is in essence an accumulator or retainer which will hold a predetermined amount of strip stock between the uncoiler and the tube mill so that when the coil of steel is entirely depleted the tube mill will continue to run on the strip stored by the looper. This provides times for a new coil C of steel to be placed in the uncoiler 1 and welded to the trailing end of the strip extending out of the looper.

After the new coil is put into the uncoiler 1 and attached to the end of the strip in the looper, the looper will refill and accelerate the speed of uncoiling to as much as 500 feet per minute and this continues until the looper is filled again. At the precise moment when the looper is filled it is necessary to decelerate the pay-off from the uncoiler 1 back to the consumption speed of the tube mill (usually 300 feet per minute) in 1.5 seconds, otherwise the strip overruns and dumps out on the floor.

In the uncoiler 1 the coil is automatically braked to prevent this dumping. When the tension on the strip is reduced due to lowered consumption by either the looper or tube mill the force of the strip on the roller 59 is reduced and this enables the spring 71 to push the strip against the brake shoe 53, thus putting a friction drag on the strip. Also, due to the lowered tension on the strip centrifugal force of the rotating coil causes the various wraps of the coil to expand outwardly and the outermost wrap comes in contact with the various faces 39 of the retaining fences. These confine the coil and exert a large frictional drag on it and this is transferred back into the coil so that each coil wrap is in essence a brake for the next wrap. In this manner the coil quickly brakes itself in an automatic manner responsive to reduced tension in the strip.

During normal consumption of the strip paid out from the coil, the unit is free-wheeling since the strip tension will tighten up the coil and pull the outer wrap away from the fences and pivot the roller 59 away from the brake shoe 53. Furthermore, the variable diameter of the tapered roller bearings 23 on which the edges of the various wraps of the coil are supported rotate at a linear speed corresponding to that of the coil wraps to substantially eliminate frictional drag due to slippage.

Modifications may be made without departing from the spirit and scope of this invention.

What is claimed is:

1. In an uncoiler for large coils of strip steel or the like, a rotatable centering spindle adapted to receive the core of a coil, a coil supporting and rotating bearing structure comprising a plurality of freely rotatable bearings extending around the spindle and adapted to support the coil on one of its side faces, and fence means surrounding the bearing structure and spindle and adapted to be engaged by a coil under expansion due to centrifugal force and exert a braking friction on the coil.

2. An uncoiler set forth in claim 1 wherein the bearing structure comprises a plurality of angularly spaced radially extending tapered roller bearings whose diameter increases with the radial distance from the spindle and whose axes are inclined to the horizontal so that a top coil contacting element of the tapered surface extends at right angles to the axis of the spindle.

3. An uncoiler as set forth in claim 2 wherein said fence means includes a plurality of angularly spaced individual fence members.

4. An uncoiler as set forth in claim 3 wherein said individual fence members are located at the outer radial ends of the tapered roller bearings.

5. An uncoiler as set forth in claim 4 wherein certain of said fence members are movably mounted to serve as gates to provide for entry and loading of a coil on the spindle.

6. An uncoiler as set forth in claim 5 including an automatic braking structure arranged to exert a frictional drag on a strip being paid out by the coil upon reduction in tension on the strip.

7. An uncoiler as set forth in claim 6 wherein said braking structure comprises a brake shoe adapted to engage one side of the strip being paid out and a roller adapted for friction-free engagement with the other side of a strip being paid out and movable toward and away from the brake shoe.

8. An uncoiler as set forth in claim 7 including a fixed position pay-out roller engageable with the strip on the same side as said brake shoe.

9. An uncoiler as set forth in claim 1 including an automatic braking apparatus for exerting friction on the strip being paid out and responsive to decreased tension in the strip to effect braking.

10. In an uncoiler for large coils of strip steel or the like, a rotatable centering spindle with a vertical axis adapted to receive the core of a coil so that the coil axis is vertical, a coil supporting and rotating bearing structure comprising a plurality of freely rotatable bearings extending around the spindle and adapted to support the coil on its bottom side face, and fence means surrounding the bearing structure and spindle and providing a vertical cylindrical surface adapted to be engaged by the outer wrap of a coil under expansion due to centrifugal force and exert a braking friction on the coil.

11. An uncoiler as set forth in claim 10 wherein said fence means comprises a plurality of angularly spaced vertically extending non-rotatable fence members located around substantially the entire outer circumference of a coil supported on said bearing structure.

12. An uncoiler as set forth in claim 11 wherein at least one of said fence members is movably mounted to serve as a gate to provide for entry and loading of a coil on the spindle.

13. In an uncoiler for large coils of strip steel or the like, a centering spindle with a vertical axis adapted to receive the core of a coil so that the coil axis is vertical, a coil supporting bearing structure adapted to support the coil on its bottom and horizontal side face for rotation about the coil axis, said bearing structure comprising a plurality of angularly spaced freely rotatable tapered roller bearings extending radially from the spindle and whose diameters increase with the radial distance from the spindle and whose axes are inclined to the horizontal so that a top coil contacting element of the tapered surface of each extends at substantially right angles to the axis of the spindle and define together a substantially horizontal plane of support for the coil, and a plurality of angularly spaced vertically extending non-rotatable fence members extending around substantially the entire outer circumference of a coil and located adjacent the outer radial ends of the tapered roller bearings and adapted to be engaged by the outer wrap of a coil under expansion due to centrifugal force and exert a braking friction on the coil.

References Cited

UNITED STATES PATENTS

| | | | |
|---|---|---|---|
| 2,706,629 | 4/1955 | Cailliot | 242—55.19 |
| 3,106,361 | 10/1963 | Boyer | 242—68 |
| 2,087,010 | 7/1937 | Wardle et al. | 242—78.6 X |
| 2,278,240 | 3/1942 | Calleson et al. | 242—78.6 |
| 2,833,489 | 5/1958 | Hall | 242—78.7 |

NATHAN L. MINTZ, Primary Examiner